United States Patent
Giere et al.

(10) Patent No.: US 10,877,145 B2
(45) Date of Patent: Dec. 29, 2020

(54) METHOD AND DEVICE FOR TRACKING OBJECTS, IN PARTICULAR MOVING OBJECTS, IN THE THREE-DIMENSIONAL SPACE OF IMAGING RADAR SENSORS

(71) Applicant: ASTYX GmbH, Ottobrunn (DE)

(72) Inventors: Andre Giere, Oberpframmern (DE); Manuel Wolf, Ottobrunn (DE)

(73) Assignee: ASTYX GmbH

( * ) Notice: Subject to any disclaimer, the term of this patent is extended or adjusted under 35 U.S.C. 154(b) by 118 days.

(21) Appl. No.: 15/772,184

(22) PCT Filed: Oct. 21, 2016

(86) PCT No.: PCT/EP2016/075424
§ 371 (c)(1),
(2) Date: Apr. 30, 2018

(87) PCT Pub. No.: WO2017/072048
PCT Pub. Date: May 4, 2017

(65) Prior Publication Data
US 2018/0313952 A1    Nov. 1, 2018

(30) Foreign Application Priority Data

Oct. 29, 2015 (DE) .......................... 10 2015 221 163
Mar. 30, 2016 (DE) .......................... 10 2016 205 227

(51) Int. Cl.
*G01S 13/90* (2006.01)
*G01S 13/34* (2006.01)
(Continued)

(52) U.S. Cl.
CPC ............ *G01S 13/9029* (2013.01); *G01S 7/03* (2013.01); *G01S 13/343* (2013.01);
(Continued)

(58) Field of Classification Search
CPC ...... G01S 13/9029; G01S 13/933; G01S 7/03; G01S 13/878; G01S 13/343; G01S 2013/93273; G01S 13/935; G01S 2007/027; G01S 2007/356; G01S 7/023
USPC ....................................................... 342/25 B
See application file for complete search history.

(56) References Cited

U.S. PATENT DOCUMENTS 6,025,800 A * 2/2000 Hager .................. G01S 13/524
342/450
6,087,928 A * 7/2000 Kleinberg ............. G01S 13/931
340/436
(Continued)

FOREIGN PATENT DOCUMENTS

DE    19705834    8/1998
DE    60107692    12/2005
(Continued)

OTHER PUBLICATIONS

International Search Report dated Feb. 16, 2017 for Application No. PCT/EP2016/075424, 8 pages.
(Continued)

*Primary Examiner* — Frank J McGue
(74) *Attorney, Agent, or Firm* — Fish & Richardson P.C.

(57) ABSTRACT

The invention relates to a device for determining a position of an object, in particular a moving object, in a three-dimensional space, characterized in that the device comprises at least two sensor units, each sensor unit having a field of view (FoV) and all sensor units are coupled by a central signal processing device.

20 Claims, 10 Drawing Sheets

(51) Int. Cl.
*G01S 13/87* (2006.01)
*G01S 7/03* (2006.01)
*G01S 13/933* (2020.01)
*G01S 7/02* (2006.01)
*G01S 7/35* (2006.01)
*G01S 13/935* (2020.01)
*G01S 13/931* (2020.01)

(52) U.S. Cl.
CPC .......... *G01S 13/878* (2013.01); *G01S 13/933* (2020.01); *G01S 7/023* (2013.01); *G01S 13/935* (2020.01); *G01S 2007/027* (2013.01); *G01S 2007/356* (2013.01); *G01S 2013/93273* (2020.01)

(56) References Cited

U.S. PATENT DOCUMENTS 7,436,348 B2 * 10/2008 Nohmi ...................... G01S 7/35
342/25 R
2002/0147534 A1 * 10/2002 Delcheccolo ......... G01S 13/723
701/45
2018/0074191 A1 * 3/2018 Bilik ....................... G01S 13/87

FOREIGN PATENT DOCUMENTS

| DE | 102006053354 | 5/2008 |
| DE | 102015110619 | 1/2016 |
| DE | 102015110619 A1 | 1/2016 |
| WO | WO2014/064548 | 5/2014 |

OTHER PUBLICATIONS

German Search Report in German Application No. 102015221163, dated Dec. 18, 2018, 9 pages (Need translation).
International Search Report and Written Opinion in Application No. PCT/EP2016/075424, dated Feb. 16, 2017, 13 pages.
EP Office Action in European Application No. 16784532.0, dated Oct. 16, 2020, 10 pages (with English translation).

* cited by examiner

Beams of a double HF sensor formed horizontally by means of digital beam formation, made up of two front ends having an independent FOV (field of view).
Via the combination of the two FOVs of the individual front ends, an extended FOV may be provided in the horizontal beam formation.

METHOD AND DEVICE FOR TRACKING OBJECTS, IN PARTICULAR MOVING OBJECTS, IN THE THREE-DIMENSIONAL SPACE OF IMAGING RADAR SENSORS

CROSS REFERENCE TO RELATED APPLICATIONS

This application is a U.S. National Phase Application under 35 U.S.C. § 371 of International Application PCT/EP2016/075424, filed on Oct. 21, 2016, which claims the benefit of Application No. DE 10 2015 221 163.0, filed on Oct. 29, 2015, and Application No. DE 10 2016 205 227.6, filed on Mar. 30, 2016, the entire contents of which are hereby incorporated by reference in their entireties.

The present invention relates to a method, a use, and a device for improving and tracking objects, in particular moving objects, in the three-dimensional space of imaging radar sensors.

Conventionally, for millimeter-wave radar sensors for use in object detection, for example, for automotive and aeronautical applications, the individual sensor units or front ends are respectively linked separately to a control unit and data evaluation device, and the collective view of the front end takes place only at the tracker level. Each front end which is added for enlarging the field of view causes the size and cost of the system to increase. In particular in aviation, each additional device which is installed and must be maintained may result in considerable expense, depending on the number and size of the sensors used.

Therefore, in particular millimeter-wave radar sensors for use in object detection, for example, automotive and aeronautical applications, should have a compact and economical design. However, this means that the number of readout and control components, as well as the required sensor units, should be minimized.

On the other hand, the sensor should enable object detection in three-dimensional space, thus also allowing precise localization both horizontally and vertically. In addition, tracking of the objects is to be made possible. The data rate at which the sensor information is processed is of great importance for the quality of the track information and thus for the quality and performance of the overall system. In the case of an architecture based on separate conventional sensor units, this in turn requires an increased number and size of readout and control components.

The object of the present invention is to provide a device, a method, and a radar system which enables a reduction of the overall system with respect to size and cost, without incurring losses with respect to the evaluation speed and accuracy.

This object is achieved with respect to the device via the features of claim 1, with respect to the method via the features of claim 12, and with respect to the radar system via the features of claim 23, as well as a use in a helicopter radar.

According to the present invention, the device for determining a position of an object in three-dimensional space, in particular a moving object, includes at least two sensor units and a central signal processing device to which the sensor units are linked. Via this measure, the advantage is achieved that the number of readout and control components is reduced to a single central data processing device which assumes the control and signal readout for any arbitrary number of sensor units. A reduction in the overall size and cost of the sensors may thus be achieved. Furthermore, data readout and data processing processes may be advantageously coordinated and optimized. The individual sensor units may also be read out and evaluated as one entity. Furthermore, the data evaluation may be improved by combining the sensor units at the readout level. Since a single signal processing device carries out the data readout and the evaluation for all sensor units, data may be partitioned and preprocessed at different levels. In the case of multiple sensor units, for example, in the case of detection in all dimensions, the individual sensors may be controlled more selectively, with less latency time.

In particular, the sensors may be selectively adapted to various requirements. In the case of a plurality of moving objects, the data readout and data evaluation may take place simultaneously, and may simultaneously include all sensor units. In the case of preprocessing of the readout data, the update rate of the velocity of the objects may also be adjusted more selectively. As a result, data congestion may be avoided on multiple levels. In addition, the quantity of data which is transmitted for imaging is minimized by preprocessing the data.

The method according to the present invention for determining a position of an object in three-dimensional space, in particular a moving object, comprises at least the method steps of providing at least two sensor units and linking the at least two sensor units to a central signal processing device.

It is innovative that the individual control, readout, and method steps, which are described in greater detail as the subject matter of the subclaims, may all be combined centrally on the signal processing device; the required data memory may thereby be reduced several fold. In addition, as a result of the sensor units being centrally controlled, the individual method steps may be partitioned and carried out in an optimized sequence, and data transmission times may be reduced.

The radar system according to the present invention comprises the method according to the present invention and the device according to the present invention. One advantage which results for the overall system is the compact and economical design, which is made possible by the reduction of the control and readout units to a single unit. These radar systems can be manufactured and maintained in a more compact and economical manner.

When used as a helicopter radar, it is possible to achieve 360° coverage in a simple manner.

Advantageous embodiments of the present invention are the subject matter of the subclaims.

The at least two sensor units are designed in such a way that a single, extended virtual field of view is created by the signal processing device from the respective data which are read out by the signal processing device. This is made possible via the selection of the main beam direction and/or via the spatial orientation of the individual sensor units in both a horizontal and vertical direction. The individual sensor units are controlled and oriented by the signal processing device both in a vertical and in a horizontal direction. This positioning of the adjacent sensor units in a sensor housing makes it possible for the fields of view of the individual sensor units to overlap by several degrees of the aperture angle.

In one additional embodiment, two or more sensor units may be arranged parallel to one another in a planar manner if they have a corresponding main beam direction. The varying direction of the aperture of the field of view is thus implemented via the varying emission characteristic. By means of one preferred arrangement in this embodiment, the coverage of the overall field of view of the sensor is achieved via the orientation of the individual sensor units.

The central signal processing device is designed in such a way that the signals received from the sensor units may be read out according to a multiplexing method. Multiplexing methods require a simultaneous linking of all sensor units to the signal processing device.

It has proven to be particularly advantageous that the central signal processing device is able to create selected object lists from the received signals of the individual sensor units by controlling, reading out, and evaluating the individual sensor units. These object lists represent signals which are received by the individual sensor units and which have been preprocessed and preselected, and thereby bring about a considerable reduction in the quantity and size of the data. Data may be processed more quickly without requiring greater computing capacity.

In one additional embodiment, the respective sensor units are made up of a front end which includes at least one transmitting antenna and at least two, preferably four, eight, or sixteen, receiving antennas. The arrangement of the receiving antennas in the front end is designed in such a way that a determination of the position in at least one plane is made possible via digital beam formation. By means of the arrangement of the transmitting antennas, a position determination in at least one plane is made possible via phase comparison and/or amplitude comparison. Wherein the number of receiving antennas is adapted to the necessary accuracy of the angle determination for the overall system, and also determines the sensitivity of the system.

The antennas are designed to be able to be operated in a frequency band from 1 GHz up to 1 THz; preferably, the operating frequency range is in a frequency band from 5 to 150 GHz, in particular in the range from 75 to 85 GHz. Millimeter waves are advantageous for height measurement in aeronautical applications. Millimeter waves penetrate dielectric substances such as snowfall or fog; for example, precise height measurement may therefore be carried out even under poor visual conditions. Smaller objects may also be detected under difficult visual conditions. The higher the frequency and the bandwidth, the better the spatial resolution.

Furthermore, the receivers and transmitting antennas are implemented using a planar printed circuit board technology which improves the stability of the sensor unit.

All devices which are suitable at the time of the present invention for signal readout, data storage, data processing, are usable for the central signal processing device, suitable according to the present invention, and also comprises future devices which are suitable according to the present invention.

Furthermore, the received signals are read out from the channels of the receiving antennas of the receiver arrays via the signal processing device, by means of a time-division multiplexing method, a frequency-division multiplexing method, a code-division multiplexing method, or a combination of these methods. The use of multiplexing methods in the data readout allows a parallel sequence of data readout and evaluation. Greater flexibility of the system is also possible via the selection or the combination of these methods.

In all multiplex methods, the range determination, i.e., the range FFT, is carried out immediately after the digitization of the analog signal data. This entails the advantage that objects having a range which renders them irrelevant for tracking may be winnowed out at this point in order to minimize the data set. These objects are then not incorporated into the object lists at all.

The multiplexing method for calculating the data from all sensor units to the same reference size, already at the raw data level, has proven to be particularly advantageous. Each sensor unit has its own frame of reference in which the objects are calculated using the aforementioned method. Conventionally, these data are then combined only for tracking an object at the stage of the tracker. The individual fields of view are viewed separately; this results in a significantly greater need for computing power and time to parameterize the individual objects of the various frames of reference to the same frame of reference.

In the time-division multiplexing method, the sensor units are read out in a time-offset manner, i.e., the transmission channel is divided into time slices, and a time interval is allocated to each sensor unit for transmission. As a result, all sensor units may be read out sequentially at extremely short time intervals. This fragmentation allows for fragmented data processing; for example, after the analog signals have been converted into digital data by means of an A/D converter, a first fast Fourier transformation (FFT) may be carried out.

The selected data are evaluated by a tracking unit and transferred for depiction as a data set. The signal data readout, the preprocessing, and the evaluation make take place simultaneously. The data readout of the second cycle may already take place while the data evaluation of the first cycle continues.

In frequency-division multiplexing, a separate frequency band is allocated to the sensor units, and the data collection takes place simultaneously, as well as the preprocessing of the data; i.e., after the analog signals have been converted into digital signals by means of an A/D converter, a first fast Fourier transformation (FFT) may be carried out. This occurs simultaneously for sensor units.

The selected data are evaluated by a tracking unit and transferred for depiction as a data set. The signal data readout, the preprocessing, and the evaluation may take place simultaneously. The data readout of the second cycle may already take place while the data evaluation of the first cycle continues.

Code-division multiplexing also collects the data simultaneously; a code is allocated to the sensor units, and it can thus be associated with the data stream of a sensor unit.

Furthermore, these digitized data which have been read out via a multiplexing method are bundled into a bundled antenna beam according to the method of digital beamforming. This is a signal processing method which is used in sensor arrays for the direction-dependent reception or transmission of signals.

In addition, a velocity calculation and a range calculation are carried out by means of a two-dimensional FFT, and subsequently, via a so-called constant false-alarm rate (CFAR) algorithm, it is possible to search for objects which stand out from the noise of the sensor or from a noisy background, so-called clutter (pre-targets).

The calculation steps of the range and velocity calculation, position determination, and the differentiation of signals from the background noise and ground reflections, allows selecting only these signals as relevant objects, already at the raw data level. Object lists are created which are made up of these preselected signal data of the sensor units. As a result, the overall data quantity is reduced and provided, which results in a quicker evaluation.

Furthermore, the signal data of the sensor units are combined in such a way that they have the same reference values and the same reference frames; thus, the virtual field of view may be formed. The data of the individual sensor units are transferred into a common reference system which may be viewed as the sum of the individual fields of view. Due to this parameterization to one system, overlaps are not depicted.

In one embodiment, the combination of the signal data into one reference frame is carried out after forming the object lists.

In another embodiment, the combination of the signal data is carried out before forming the object lists. This may be carried out after linking the received signals into bundled data, or after the velocity calculation (Doppler FFT), or after the range calculation (range FFT).

Thus, the position of an object which originally has its reference values in the field of view of a sensor unit may be depicted and tracked in the virtual field of view by means of a tracking algorithm.

Particularly advantageous is the combination of the two or multiple reference systems into a single virtual reference system for tracking the objects. Since the individual object points do not have to be transferred and linked from one system to the other, the quantity of data to be evaluated is reduced. In particular since the data are preprocessed and preselected, the quantity of data is reduced; this is particularly important in the case of high data read-out rates which must be evaluated in an ad-hoc manner, so that a pile-up or data congestion of the data packets is not able to occur.

Conventionally, in such cases, this may be avoided via larger, or multiple, data processing devices, or via the extension of the data read-out paths.

Individual embodiments of the present invention are to be depicted with reference to the following drawings. Corresponding parts are provided with the same reference characters in all figures.

Exemplary embodiments of the present invention will be described in greater detail based on figures.

Figure 1:
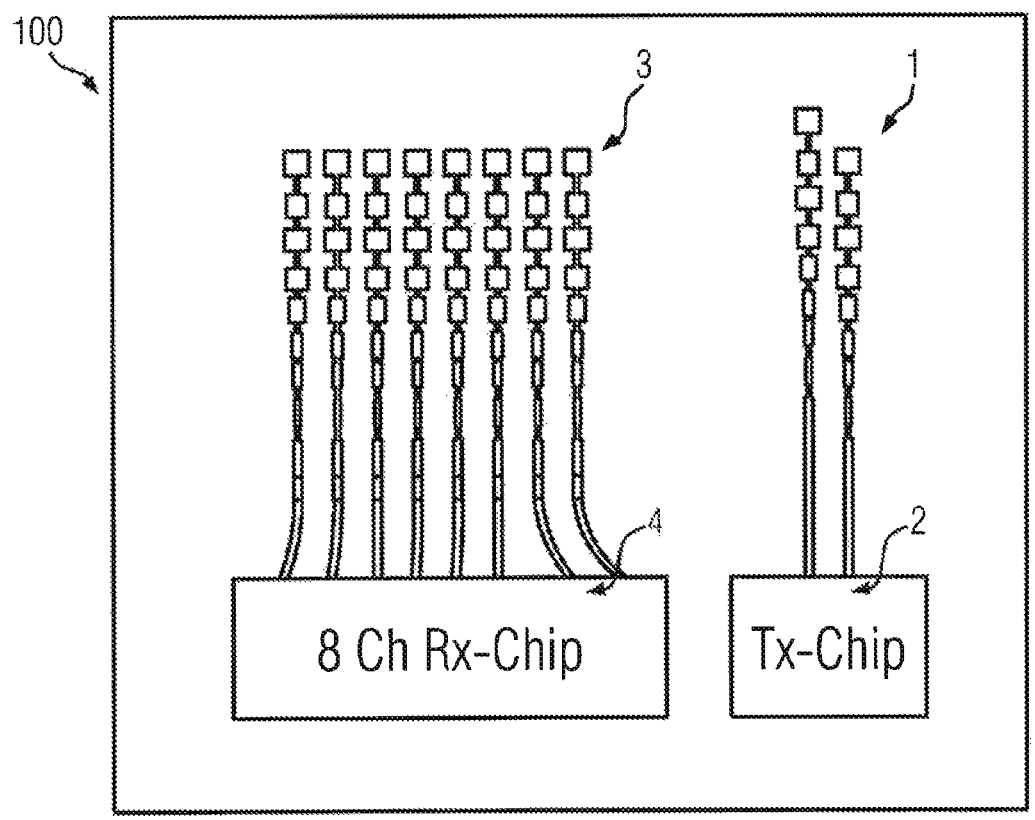
FIG. 1 shows an antenna arrangement in a front end.

FIG. 1 shows an example of the antenna arrangement (100) in a front end. Two transmitting antennas (1) are coupled to a control and readout unit (2), and an array (3) made up of eight receiving antennas is linked to a control and readout unit (4). This front end shown in FIG. 1, for example, is designed for height determination by means of phase monopulse, which is achieved via the staggered transmitting antennas.

The arrangement and the respective field of view of a sensor having two or three sensor units are illustrated in the two following figures. It is also shown that the geometry of the housing, as well as the positioning of the sensor unit, are a function of the number of sensor units used and the intended overlap zone of the fields of view.

Figure 2:
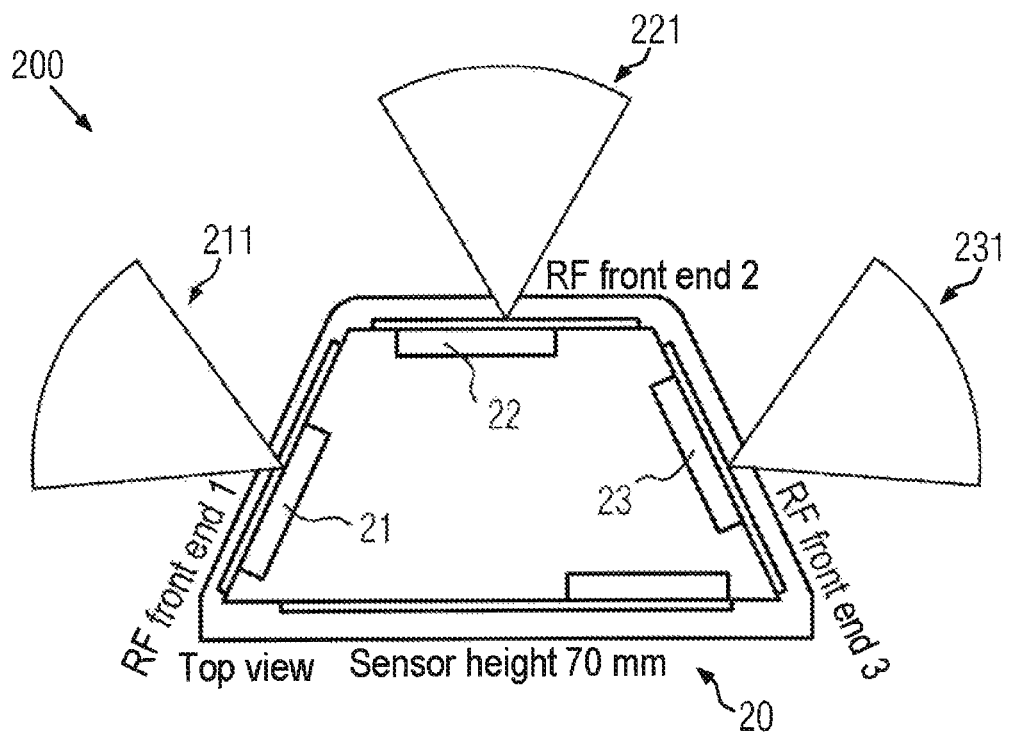
FIG. 2 shows one embodiment including a sensor having three sensor units.

FIG. 2 shows one embodiment including a sensor (200) having three sensor units (21, 22, 23) which respectively include an antenna arrangement (100) and which are positioned in a sensor housing (20) and respectively schematically comprise one field of view (211, 221, 231).

Figure 3:
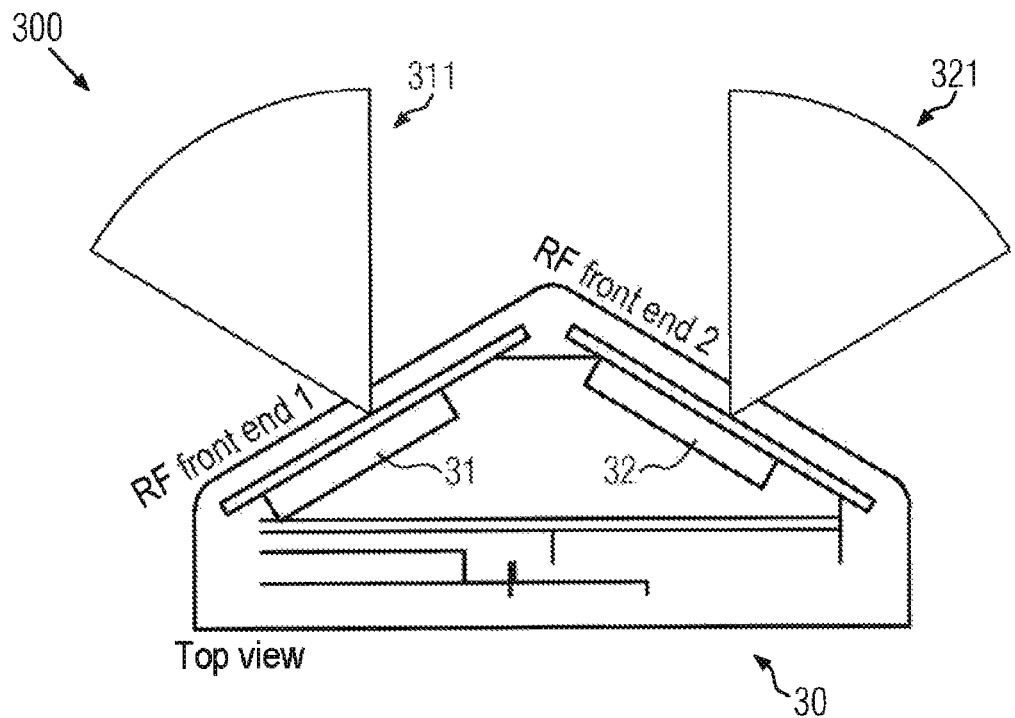
FIG. 3 shows an additional embodiment including a sensor having two sensor units.

FIG. 3 shows another embodiment including a sensor (300) having two sensor units (31, 32) which respectively include an antenna arrangement (100) and which are positioned in the sensor housing (30) and respectively schematically comprise one field of view (311, 321).

Figure 4:
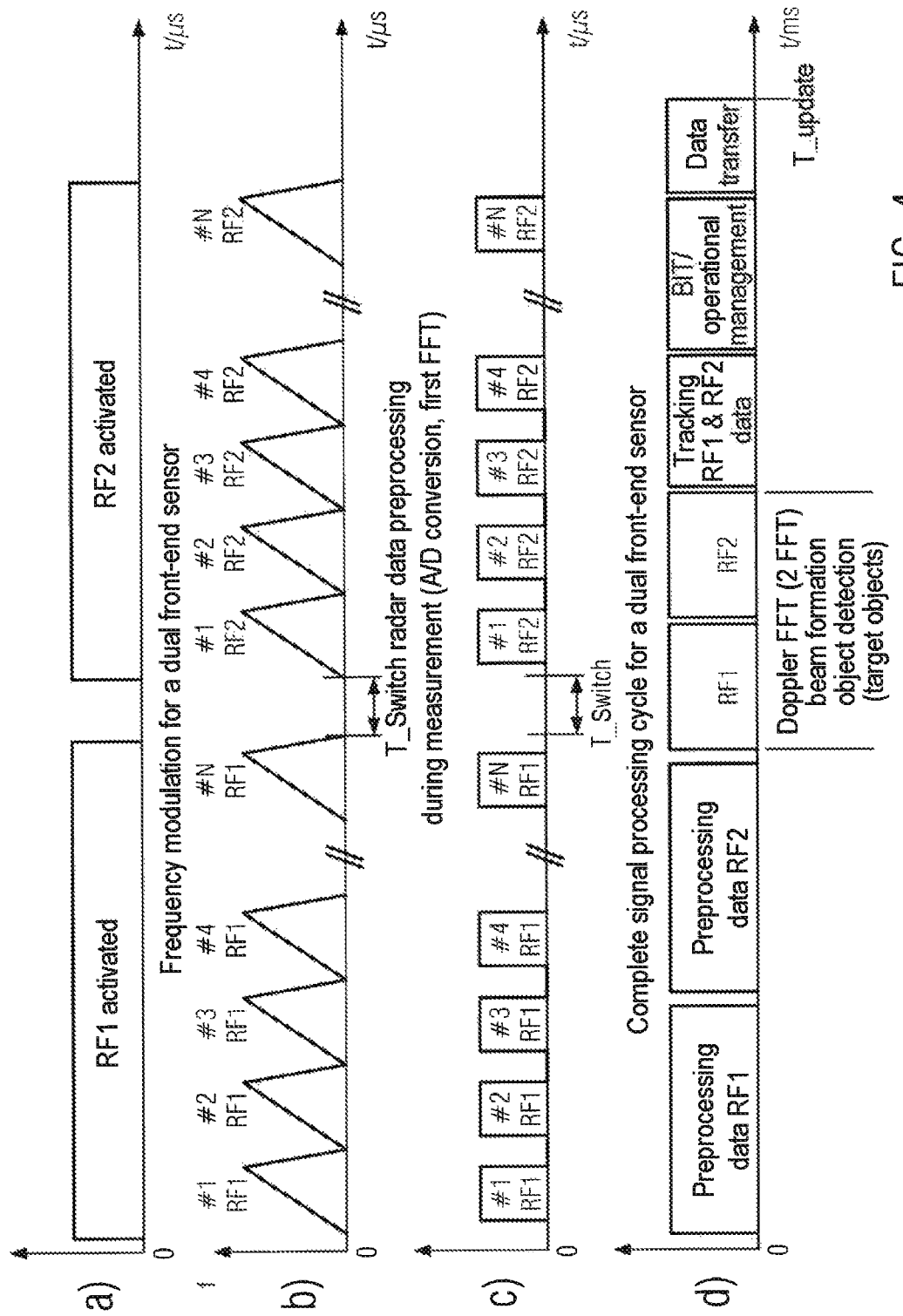
FIG. 4 shows the readout and signal processing sequence for a sensor having two sensor units, using a time-division multiplexing method.

FIG. 4 shows a readout and signal processing sequence of the signal processing device for a sensor having two sensor units. In this case, the data readout takes place via a time-division multiplexing method. FIGS. 4a to 4d illustrate the temporal sequence of the individual readout steps and the simultaneous evaluation of these read-out data. FIG. 4a shows the temporal activation sequence of the two sensor units. In a first time span in the microsecond range, the antenna arrangement of the front end of the first sensor unit is activated; after a switchover period, the first sensor unit is deactivated and the second sensor unit is activated. FIG. 4b shows the respective temporal sequence of the individual time-portioned signal data readout. FIG. 4c shows that the data are further processed as time-portioned data packets. The time-portioned analog signal is converted into a digital data packet by means of A/D converters; a fast Fourier transformation for a range calculation (range FFT) is used on this data packet before the data are transferred in this form for intermediate storage or further processing. This data processing takes place simultaneously with the data acquisition, as shown in FIG. 4b. Finally, FIG. 4d shows the overall temporal sequence of the signal processing cycle as a whole.

After a data readout and preprocessing the data, as shown in FIGS. 4a to 4c, the data set of the respective sensor activation units RF1 and RF2 evaluated by means of a velocity calculation (Doppler FFT), and the position is determined via the method of beam formation, and an object detection algorithm selects the object data from these sensor activation units.

Figure 5:
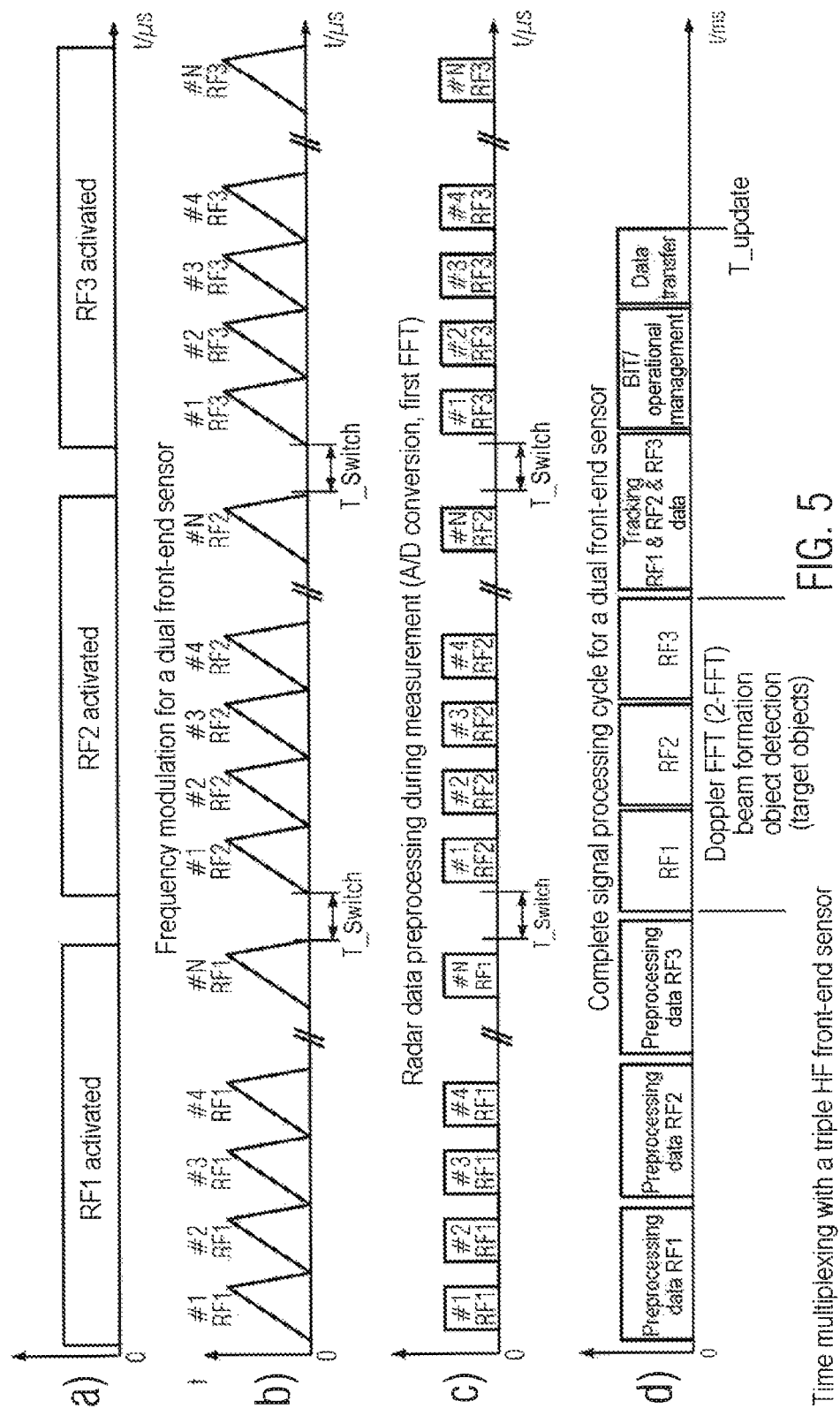
FIG. 5 shows, in an analogous manner, the data readout and evaluation for a sensor having three sensors.

FIG. 5 shows, in an analogous manner, the data readout and evaluation in the case of a sensor having three sensor units.

Figure 6:
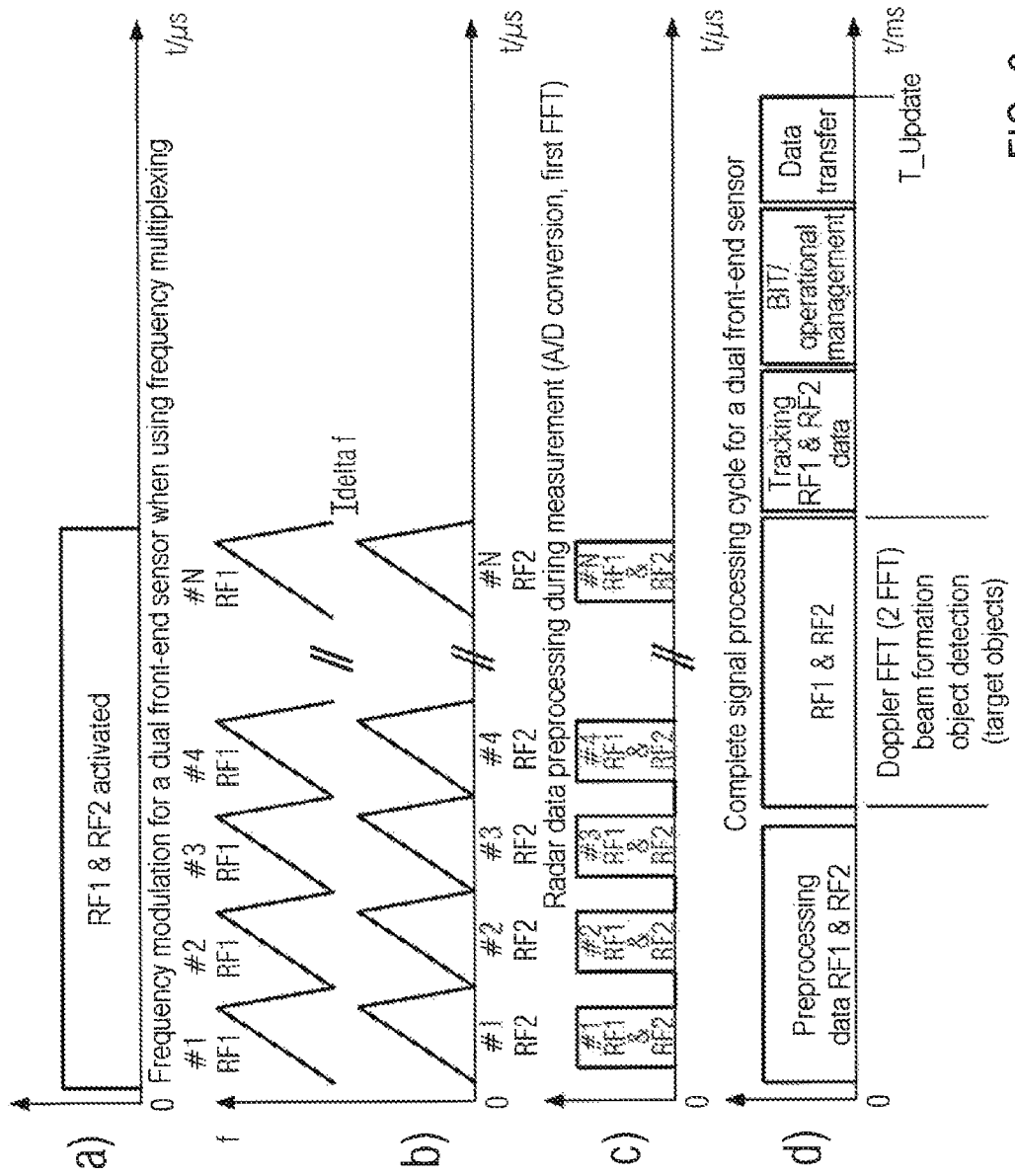
FIG. 6 shows the simultaneous data readout and evaluation using a frequency-division multiplexing method, in the case of a sensor having two sensor units.

FIG. 6 shows where the simultaneous data readout and evaluation is visible via a frequency-division multiplexing method in the case of a sensor having two sensor units. FIG. 6a shows the simultaneous data readout, in one time interval, of the two sensor units, which were both activated simultaneously. FIG. 6b shows that a particular frequency band was allocated to each sensor unit; the simultaneously received analog signals are allocable to the respective sensor unit. Furthermore, FIG. 6c shows the preprocessing of the signal data from one time interval. The analog signals of the two sensor units are converted by means of an A/D converter into digital data packets, and a fast Fourier transformation for a range calculation (range FFT) is used on these data packets, before the data are transferred in this form for intermediate storage or further processing. The entire temporal sequence of the signal processing cycle is depicted in FIG. 6d. After a data readout and preprocessing of the data as shown in FIGS. 6a to 6c, the data set of the two sensor units is evaluated jointly by means of a velocity calculation (Doppler FFT), and using the method of beam formation, the position is determined, and an object detection algorithm selects the object data from this common sensor activation unit.

Figure 7:
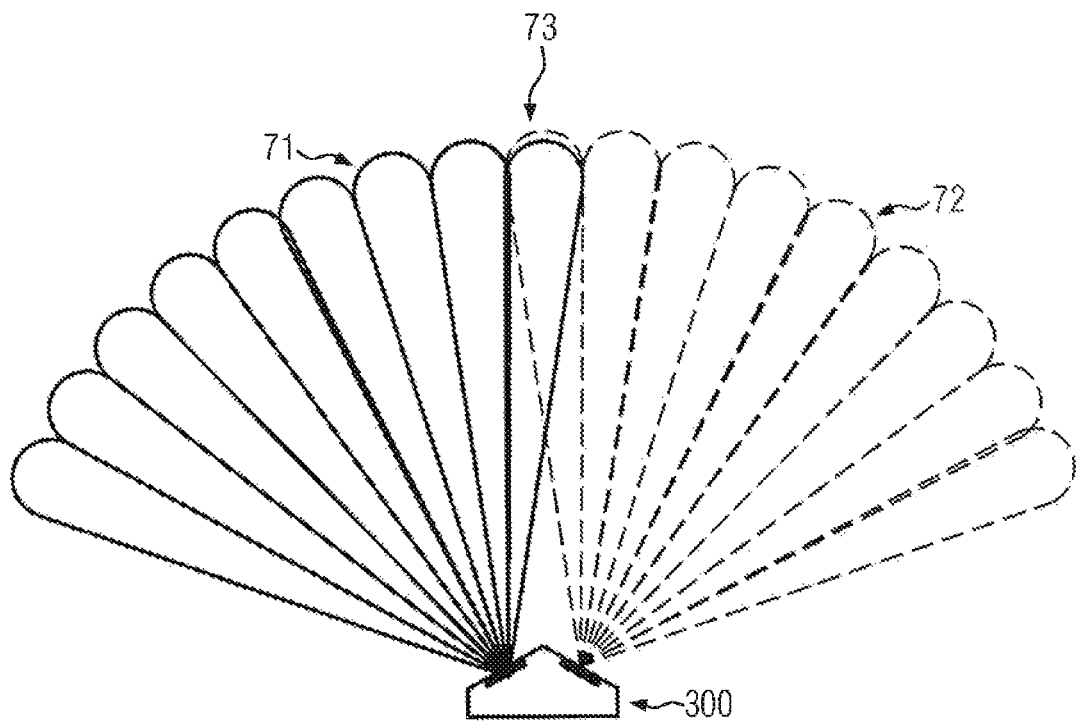
FIG. 7 shows a sensor having two sensor units with the field of view made up of beam lobes.

FIG. 7 depicts the overlap of the aperture angles of the individual adjacent sensor units, which a sensor (300) having two sensor units as shown in FIG. 3, having beam lobes formed via beam formation, which together respectively form a field of view for one sensor unit. The two fields of view (71, 72) together, and via the two overlapping beam lobes (73), a continuous extended field of view may be provided.

Figure 8:
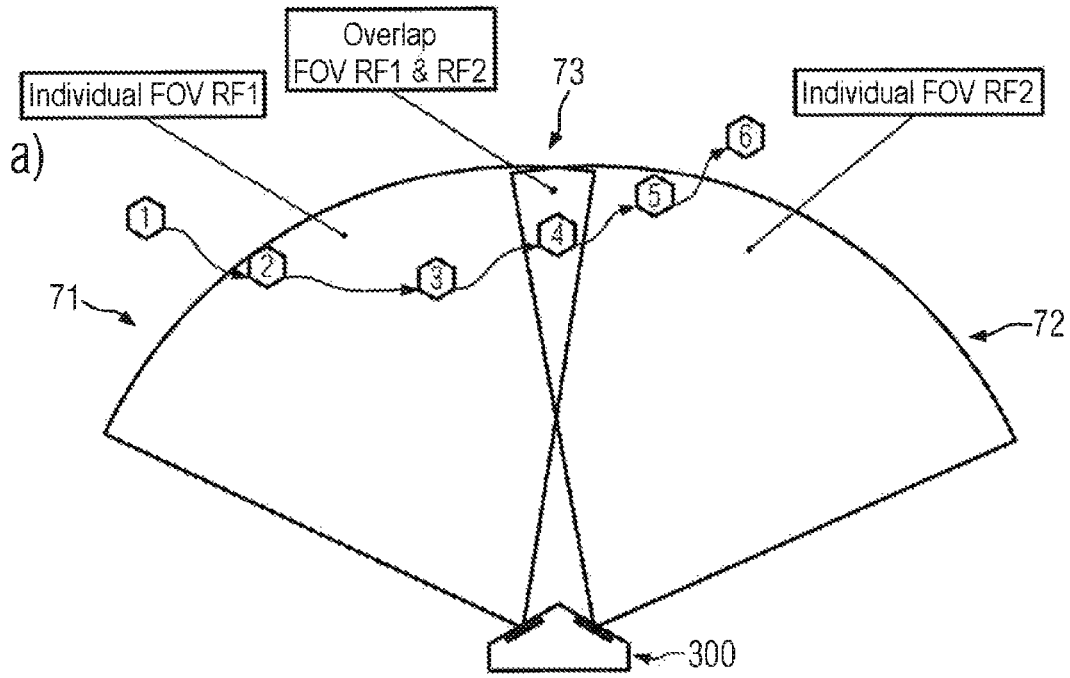
FIG. 8 shows a tracked object track which passes through two fields of view.
Figure 8:
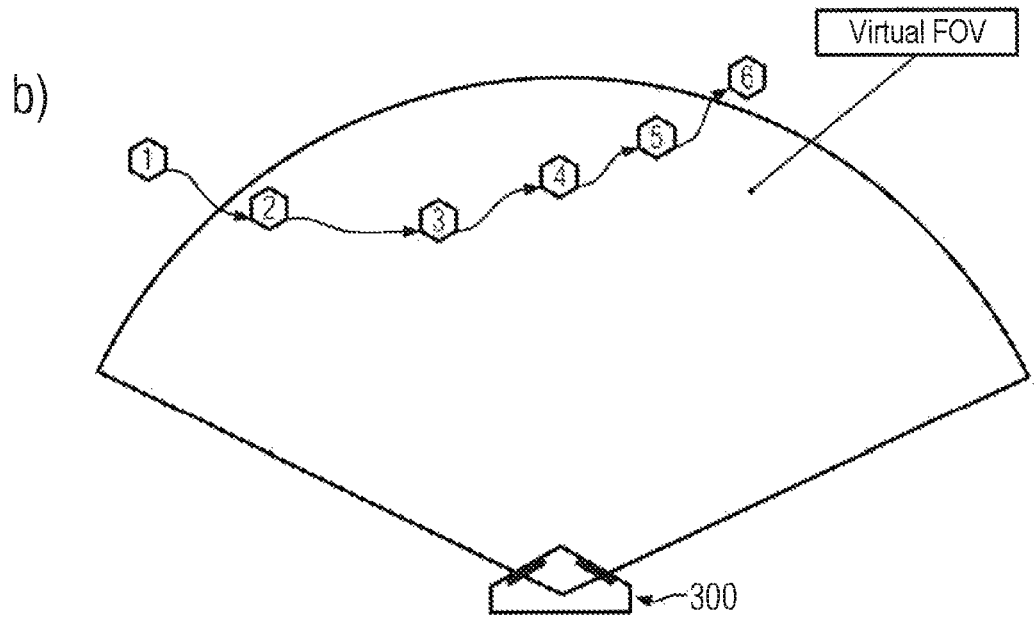

FIG. 8 shows a sensor (300) having two sensor units as shown in FIG. 3, having beam lobes formed via the beam formation, which together respectively form a field of view for one sensor unit. By means of the two fields of view (71, 72) together, and via the two overlapping beam lobes (73), a continuous extended field of view may be provided. FIG. 8 schematically depicts the individual examination of the fields of view, showing the fields of view (71, 72) formed by the beam lobes (73) and the overlap region. Wherein in FIG. 8a, the two fields of view and the overlap region are depicted, and the tracked object track crosses from one field of view into the other. The object trail point 4 is read out and evaluated by the two sensor units and is then transferred from one reference system into the other. However, FIG. 8b shows that the same object trail in a virtual extended field of view, for example, as depicted in FIG. 7 and FIG. 8a, is formed from the fields of view of the individual sensor units.

A helicopter radar is envisaged as one particular application, wherein the decisive advantage lies in the fact that a complete 360° all-around coverage of the surroundings may be achieved with only two sensor devices which are fixedly mounted on the helicopter structure below the rotor axis, without the necessity of additional superstructures or extensions. In addition, due to the high level of integration of the individual components, the overall system may be implemented via these two sensor devices, since they may be designed as so-called smart sensors. In this case, the overall data processing and the generation of a 360° status report may be implemented within the sensor devices. For this purpose, on the one hand, communication takes places between the preferably two sensors, which are preferably attached on the left and right sides of the helicopter, or on the front and rear of the helicopter. Likewise, communication takes place with the avionics system of the helicopter, in which the detected obstacles are transmitted to said system. Thus, a calculation or evaluation of the data within the helicopter avionic electronics is no longer necessary; only the output to the HMI (human-machine interface) in the form of optical and/or acoustic signals and warnings is assumed by the avionic electronics. For the variant for retrofitting helicopters which are already in operation, or for stand-alone integration, instead of linking via the avionic electronics, an addition interface box is required which generates a display and/or an acoustic signal from the information about the individual observed regions. In any case, the overall sensor system functionality is accommodated exclusively in the sensor devices.

In this case, in one sensor housing, two or more, preferably three, individual front ends are initially mounted in the sensor housing, so that the individual FOVs of two adjacent front ends overlap by several degrees of the aperture angle.

For this purpose, the raw radar data are initially prepared and are combined into an overall image for the individual sensor units. The pre-targets thus calculated are then plausibility-tested over multiple measurements and combined into tracks. Other system inputs (if they are available in the respective helicopter installation) are also taken into account, for example, ground speed, rotations of the helicopter, and others. In addition, the track information is exchanged with the combined adjacent sensor units (if present), in order to achieve an overall image for 360° coverage. An individual sensor unit has a maximum monitored range of up to 200° azimuth. The individual sensor units are designed in such a way that they may be interconnected directly to other similar sensor units to form an overall sensor system, without requiring adaptations. For doing this, no additional electronic hardware is required; a simple cable connection is sufficient. Thus, larger areas may be monitored, and additional sensors may also be installed, in order also to cover possible blind spots caused by extensions or the like.

Figure 9:
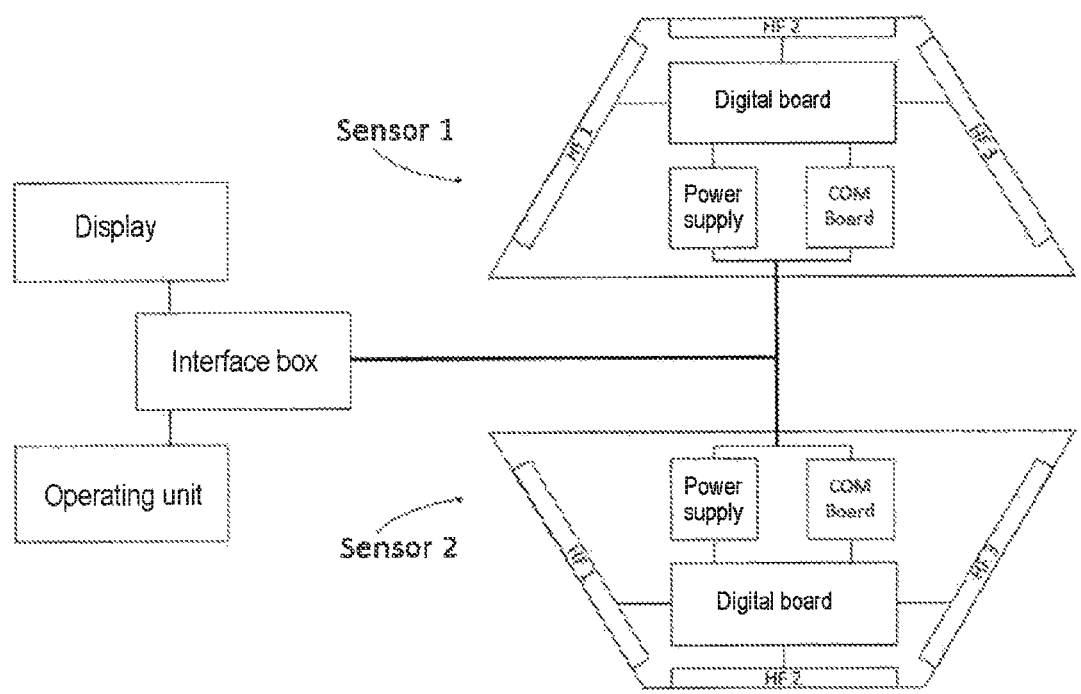
FIG. 9 shows the use of two sensors according to the application, for 360° coverage.

In FIG. 9, only two devices according to the present invention are schematically arranged adjacent to one another in such a way that 360° coverage is made possible. In this embodiment, it is also advantageous if three sensor units are used in each case.

Figure 10:
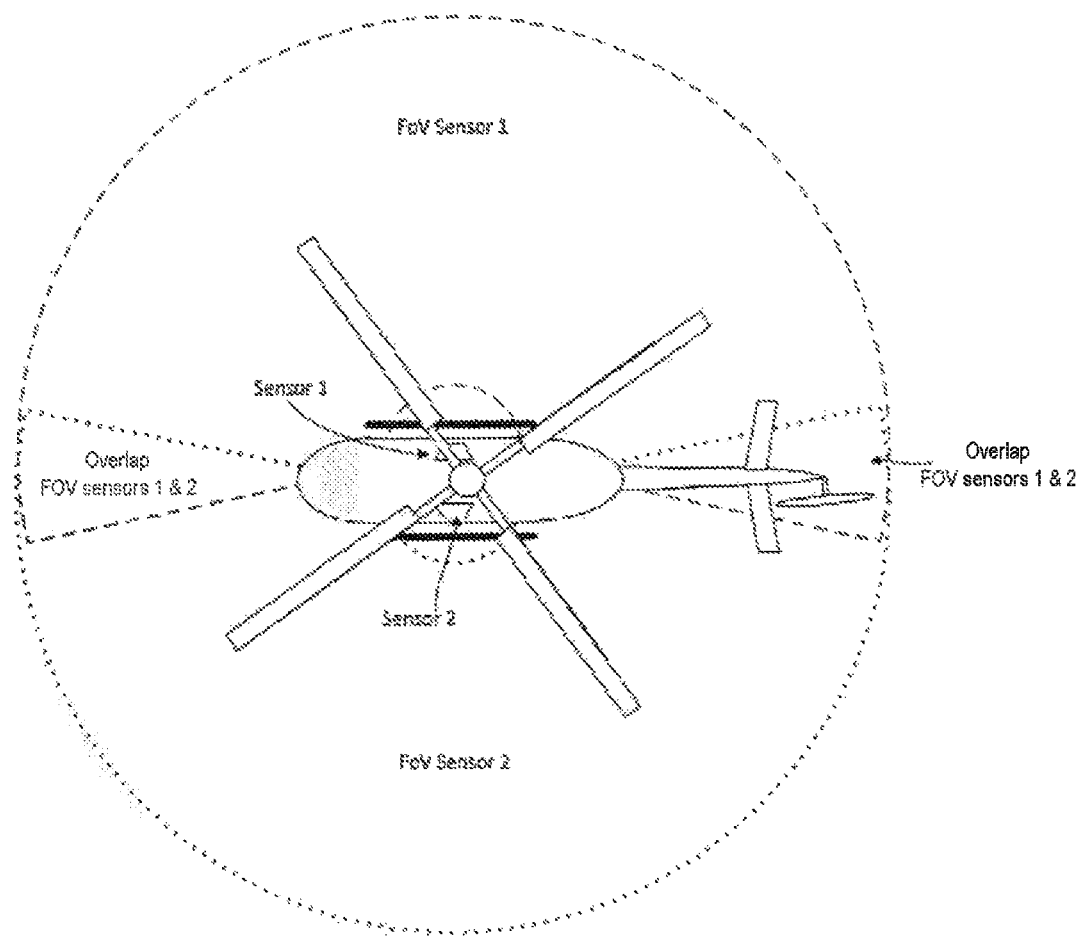
FIG. 10 shows the use of the sensor arrangement according to FIG. 9, in a helicopter system.

In FIG. 10, furthermore, the example arrangement as a helicopter radar is depicted, namely, the corresponding placement of the two devices according to the present invention on the helicopter. In FIG. 10, the 360° coverage is clearly depicted, as well as two overlap regions.

The invention claimed is:

1. A device for determining a position of a moving object in three-dimensional space, the device comprising:
   a central signal processing device,
   at least two sensor units, wherein each sensor unit has a respective field of view (FOV) different from a FOV of the other sensor units, and wherein the sensor units are linked via the central signal processing device,
   wherein the central signal processing device is operable to:
      receive, from the at least two sensor units, sensor signals corresponding to a plurality of objects in the respective FOVs of the at least two sensor units,
      pre-process the sensor signals, wherein pre-processing the sensor signals comprises:
         determining, for each of the objects, a range of the object from the at least two sensor units,
         identifying a subset of the objects within a threshold range from the at least two sensor units, and
         identifying a subset of the sensor signals corresponding to the subset of the objects;
      generate an object list comprising an indication of the subset of the objects and an indication of a subset of the sensor signals; and
      track, based on the subset of the sensor signals, the position of the moving object over time in three-dimensional space.

2. The device as claimed in claim 1, wherein the central signal processing device is operable to generate a virtual field of view based on the sensor signals to provide a single extended field of view.

3. The device as claimed in claim 2, wherein the extended field of view is generated based on an orientation of each of the sensor units and/or a main beam direction of each of the sensor units.

4. The device as claimed in claim 1, wherein the central signal processing device is operable to read the sensor signals using a multiplexing method.

5. The device as claimed in claim 1, wherein the sensor unit includes a front end comprising two receiving antennas and a transmitting antenna.

6. The device as claimed in claim 5, wherein a front end has four, eight, or sixteen receiving antennas.

7. The device as claimed in claim 5, wherein the receiving antennas are arranged in such a way that the device is operable to perform a position determination in at least one plane via digital beam formation.

8. The device as claimed in claim 5, wherein the transmitting antennas are arranged in such a way that the device is operable to perform a position determination in at least one plane via phase comparison and/or amplitude comparison.

9. The device as claimed in claim 1, wherein the sensor units are operated in the frequency band from 1 GHz to 1 THz.

10. The device as claimed in claim 5, wherein the receiving antennas and transmitting antennas are implemented using a planar printed circuit board technology.

11. A method for determining a position of a moving object, the method comprising:
receiving, by a central signal processing device from at least two sensor units linked to the central signal processing device, sensor signals corresponding to a plurality of objects in respective fields of view (FOVs) of the at least two sensor units, wherein each FOV is different from each other FOV,
pre-processing the sensor signals by the central signal processing device, wherein pre-processing the sensor signals comprises:
determining, for each of the objects, a range of the object from the at least two sensor units,
identifying a subset of the objects within a threshold range from the at least two sensor units, and
identifying a subset of the sensor signals corresponding to the subset of the objects;
generating, by the central signal processing device, an object list comprising an indication of the subset of the objects and an indication of a subset of the sensor signals; and
tracking, based on the subset of the sensor signals, the position of the moving object over time in three-dimensional space.

12. The method as claimed in claim 11, further comprising bundling the sensor signals according to a time-division multiplexing method, a frequency-division multiplexing method, a code-division multiplexing method, or a combination of thereof.

13. The method as claimed in claim 11, further comprising bundling the sensor signals according to a method of digital beam formation into a bundled antenna beam.

14. The method as claimed in claim 13, further comprising performing a velocity correction and a range correction, wherein performing the velocity correction and the range correction comprises:
performing a two-dimensional FFT with respect to the sensor signals,
subsequent to performing the two-dimensional FFT, comparing the sensor signals corresponding to overlapping antenna rows of the at least two sensor units that correspond to the bundled antenna beam.

15. The method as claimed in claim 11, further comprising combining the subset of the sensor signals for joint evaluation.

16. The method as claimed in claim 15, wherein combining the subset of the sensor signals comprises:
converting the subset of the sensor signals into common reference values, and
determining a position of the one or more objects in a virtual field of view, the virtual field of view including the FOVs of each of the at least two sensor units.

17. The method as claimed in claim 16, wherein combining the subset of the sensor signals is performed subsequent to generating the object list.

18. The method as claimed in claim 16, wherein combining the subset of the sensor signals is performed prior to generating the object list.

19. The method as claimed in claim 11, further comprising generate a virtual field of view based on the sensor signals to provide a single extended field of view.

20. The method as claimed in claim 11, further comprising performing an object tracking algorithm with respect to the subset of the sensor signals.

* * * * *